United States Patent [19]

Bridgnell et al.

[11] 4,355,780
[45] Oct. 26, 1982

[54] HEAT EXCHANGER MOUNTING DEVICE

[75] Inventors: David G. Bridgnell, Rolling Hills; Frederick W. Jacobsen, Garden Grove, both of Calif.

[73] Assignee: The Garrett Corporation, Los Angeles, Calif.

[21] Appl. No.: 130,674

[22] Filed: Mar. 17, 1980

Related U.S. Application Data

[63] Continuation-in-part of Ser. No. 597,049, Jul. 18, 1975, Pat. No. 4,216,937, which is a division of Ser. No. 447,906, Mar. 4, 1974.

[51] Int. Cl.³ .............................. F16M 1/00; F28F 7/00
[52] U.S. Cl. ................................ 248/675; 248/DIG. 1
[58] Field of Search ................. 248/675, 674, DIG. 1; 165/69, 162

[56] References Cited

U.S. PATENT DOCUMENTS

| | | | |
|---|---|---|---|
| 1,840,417 | 1/1932 | Seelert | |
| 1,980,753 | 11/1934 | Gebhard et al. | 165/69 |
| 1,986,132 | 1/1935 | Bigelow | 248/DIG. 1 |
| 2,503,595 | 4/1950 | Preston | 165/162 X |
| 2,594,761 | 4/1952 | Fletcher et al. | 165/162 X |
| 2,668,692 | 2/1954 | Hammell | 165/69 X |
| 2,752,128 | 6/1956 | Dedo | 165/162 X |
| 2,778,629 | 1/1957 | Johnson | 267/152 |
| 2,968,116 | 1/1961 | Arenson | 248/188.9 |
| 3,129,836 | 4/1964 | Frevel | 220/1 R |
| 3,208,707 | 9/1965 | Blumrich | 248/188.9 |
| 3,448,949 | 6/1969 | Kelley | 267/153 X |
| 4,191,244 | 3/1980 | Keske | 165/69 |
| 4,196,774 | 4/1980 | Hoffmann | 165/69 X |

Primary Examiner—J. Franklin Foss
Attorney, Agent, or Firm—Joel D. Talcott; Terry L. Miller; Albert J. Miller

[57] ABSTRACT

A device for floatably supporting a portion of a heat exchanger core to a shell for accommodating thermal expansion.

33 Claims, 8 Drawing Figures

HEAT EXCHANGER MOUNTING DEVICE

This is a continuation-in-part of copending application Ser. No. 597,049, filed July 18, 1975, now U.S. Pat. No. 4,216,937, issued Aug. 12, 1980, which is in turn a divisional of Application Ser. No. 447,906, filed Mar. 4, 1974, now U.S. Pat. No. 3,910,542, issued on Oct. 7, 1975.

This invention relates to devices for mounting a central member in floating configuration within an exterior structure and, more particularly, to an arrangement for mounting a heat exchanger core within a structural shell.

The core matrix of a heat exchanger for industrial turbine applications is subjected to extreme thermal stresses caused by temperature differentials in the fluids passing through the heat exchanger. Additional stresses from shock and vibration may seriously affect the life of the heat exchanger. Various arrangements of the prior art are known for supporting heat exchanger devices while accommodating variations in dimensions due to thermal expansion. The Kovalik U.S. Pat. No. 3,294,159 discloses a plurality of spring biased support assemblies for mounting a tube-type heat exchanger within a shell.

Any mounting system for the heat exchanger core must be capable of reacting against inertial loading in any direction and yet allow essentially unrestrained thermal expansion of the core with respect to the housing. The mount must distribute the mount point loads into the core without requiring relatively thick local structure adjacent to the core which would give rise to large transient thermal stresses, and without producing unacceptable load concentrations and must assure proper contact between the mounts and core under conditions of shock, vibration and thermal growth.

To this end, the present invention provides a device for floatably mounting the core matrix of a heat exchanger to a shell by means which accommodate the variations in dimension due to thermal expansion while protecting against damage from variable loads and shock.

In brief, the arrangement in accordance with the present invention comprises mounting devices incorporating fine dimensional structure which accommodate thermal expansion while serving to distribute the mounting point loads into the core without requiring relatively thick structural elements adjacent the core, thus providing compatibility with the core structure and avoiding large thermal stresses and unacceptable load concentrations.

In accordance with the present invention, a series of layers of fine structure, separated from each other but joined together by transverse sheet members of varying thickness and lateral dimension, serve to provide the desired accommodation of variation in core dimension from thermal expansion and to distribute the mount loads into the core matrix. The number of such layers and the graduation of the thickness of the required sheet members is determined based upon the thermal and mechanical load requirements.

One end of the mount is fastened to the heat exchanger core, as by welding or brazing, while the other end is secured by suitable means to the shell. By utilizing a bushing positioned within the mount for attachment to a bolt or pin, the bolt or pin will extend into the mount with only a small portion thereof extending beyond the mount instead of the bolt or pin being secured to an outer end of the mount as disclosed in the aforementioned U.S. Pat. No. 4,216,937. As a result, the offset moment which could produce highly damaging forces is minimized. The fine structure may comprise metal honeycomb or finned elements of the type utilized in the core itself as the separating structural elements within the respective fluid layers between the layer separating plates. Such mounting structure is preferably terraced in proceeding from layer to layer from one end to the other, with the gauge and density of the honeycomb material being varied in different portions of the mount. Further, the mount can be made capable of reacting against shear loads in any direction by the use of radially positioned fins which are preferably of the offset type.

A better understanding of the present invention may be had from a consideration of the following detailed description, taken in conjunction with the accompanying drawing, in which.

While the devices of the present invention are particularly adapted for use in a heat exchanger to floatably mount the core of the heat exchanger to a shell such as in the engine compartment of a moving vehicle, and the manner of this operation is described in the preferred embodiment, it is to be understood that the device is readily adaptable to other applications. The heat exchanger illustrated in the preferred embodiment is intended to be representative of a variety of heat exchangers, each of which may have a core matrix subject to thermal stress from expansion and contraction of the core caused by thermal cycling of the heat exchanger in use and also subject to vibration or shock loads in the shell.

Figure 1:
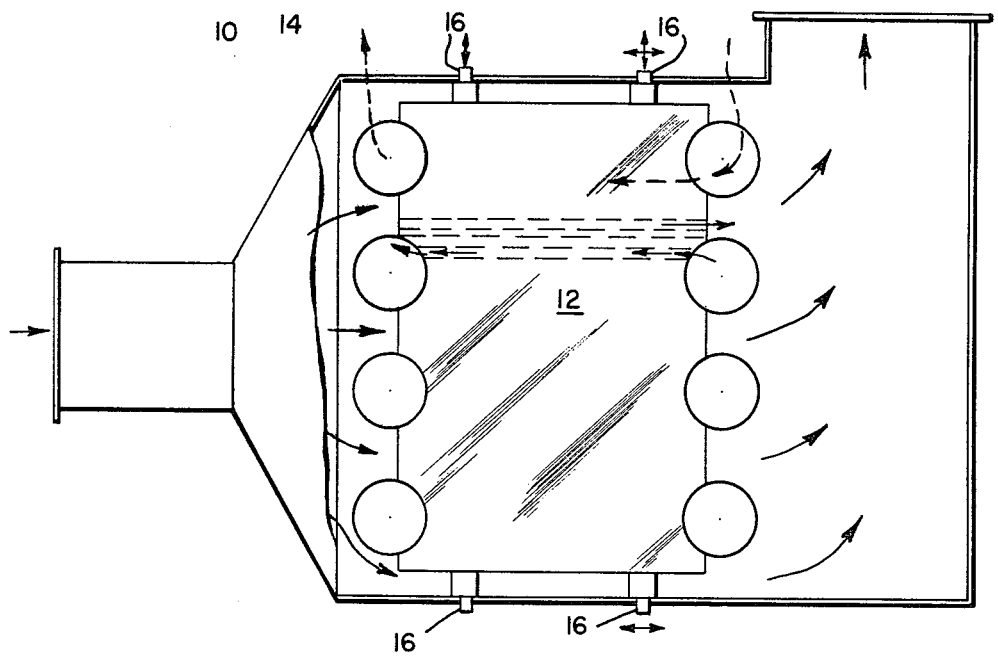
FIG. 1 is a generalized representation, partially broken away, of a heat exchanger core mounting arrangement in accordance with the present invention.

In FIG. 1 there is illustrated a heat exchanger shown generally at 10 and having a core matrix 12 which is floatably supported to a shell 14 by mounting devices 18 in accordance with a preferred embodiment of the present invention. The shell 14 as illustrated, for example, is a box-like container in the engine compartment of the moving vehicle with suitable open ends for receiving the flow of one fluid through one end in heat exchanging relationship with another fluid in the core matrix 12 in typical heat exchanger operation. The core matrix 12 is floatably supported in the shell 14 for movement with respect to the heat exchanger axis by the mounting devices 18 of the invention.

Figure 2:
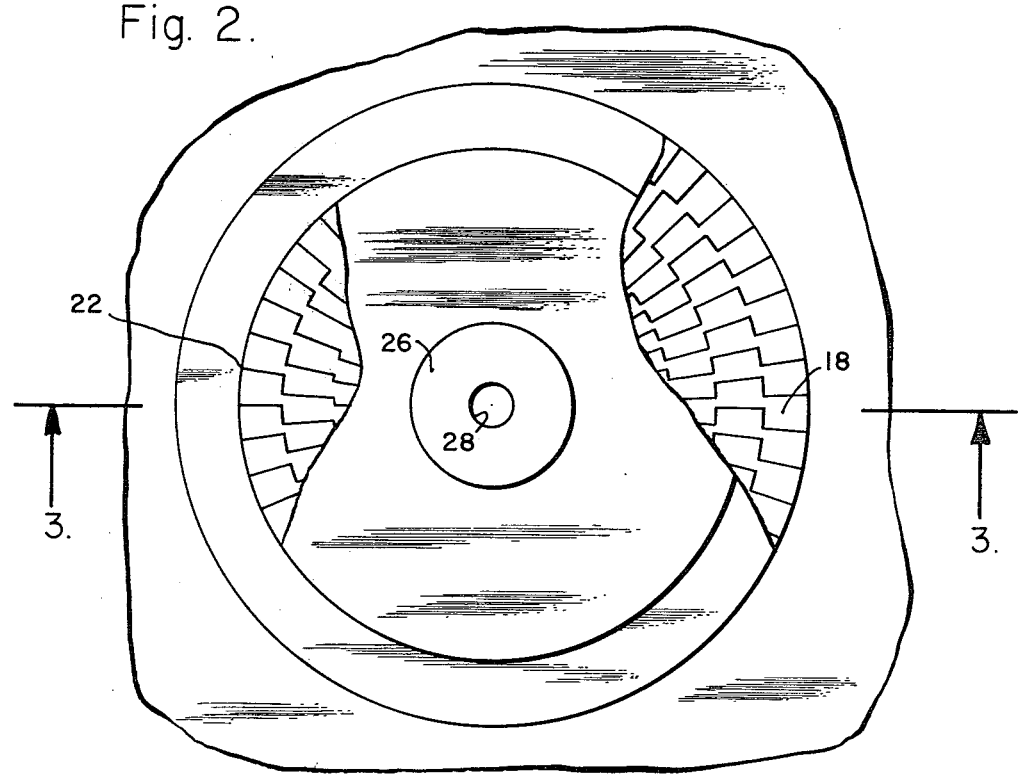
FIG. 2 is a plan view, partially cut away of a mounting device of this invention.
Figure 3:
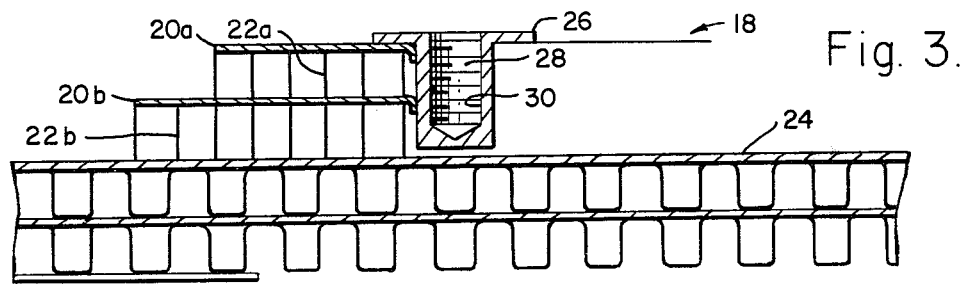
FIG. 3 is a cross sectional view taken generally along the line 3—3 of FIG. 2.

Referring now to FIGS. 2 and 3, there is shown a preferred embodiment of the invention in the form of a mount 18 comprised of a series of layers or sandwich of sheets 20 of varying thickness interspersed with fin structure layers 22. The outermost sheet 20a is the thickest of the set and the other sheets become progressively thinner in accordance with their proximity to the core 24. The mount 18 is constructed with a terraced effect or shape such that the outer sheet 20a and adjacent fin layer 22a have a lesser lateral dimension than the adjacent sheet 20b and layer 22b. If additional layers are used, these outer layers will have a lesser lateral dimension than the innermost sheets and fin layers. The inner fin layer 22b is adjacent to the core 24 and secured thereto by welding or brazing. The remainder of the assembly of the mount 18 is also fastened together, as by brazing. The fin layers 22 are preferably in the form of radial offset fins as shown in FIG. 2 positioned in a fanned or radial configuration. Such an arrangement provides a substantial advantage inasmuch as radial fins are capable of withstanding shear load in any direction unlike parallel fin configurations which generally have a shear load capability which is directional in nature.

A socket or bushing 26 is preferably located at a centrally positioned attachment point within the mount 18 with an opening at 28 thereof directed outwardly from the heat exchanger core 24. The bushing 24 is also preferably brazed in place and may be provided with an inner thread 30 for securing the mount to a bolt. If the mount is to engage a smooth pin, the thread 30 may be omitted.

Figure 4:
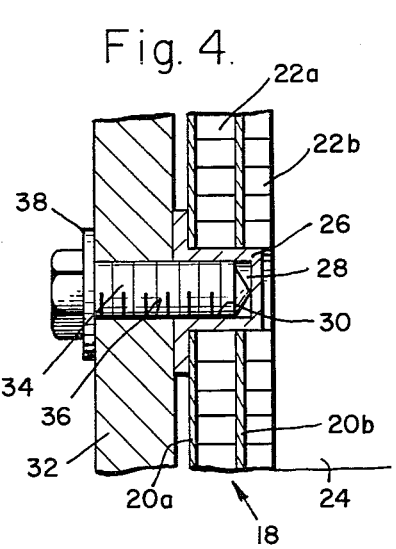
FIGS. 4–6 are fragmentary cross sectional views, similar to FIG. 3 illustrating alternative mounting means constructions and means of attachment to a shell wall.

FIG. 4 illustrates the mounting of a heat exchanger core 24 to a wall 32 of the shell 14 of FIG. 1 by use of the mount 18 having a bushing 26. Securement is provided by a bolt 34 which is passed through aperture 36 in the wall 32 and threaded to the thread 30 in the bushing 26 for releasable securement of the mount 18 and, correspondingly, the core 24. A washer 38 may be utilized in conjunction with the bolt 34 if desired.

As can be seen, by utilizing a bolt for securing the mount 18 to the wall 32, a fixed point connection may be provided whereby that portion of the core adjacent the bolted mount 18 remains fixed in relation to the wall 32. The fine structure in the mount 18 develops a controlled thermal gradient along the mount axis and has sufficient resilience to accomodate thermal growth as the core 12 heats.

Figure 5A:
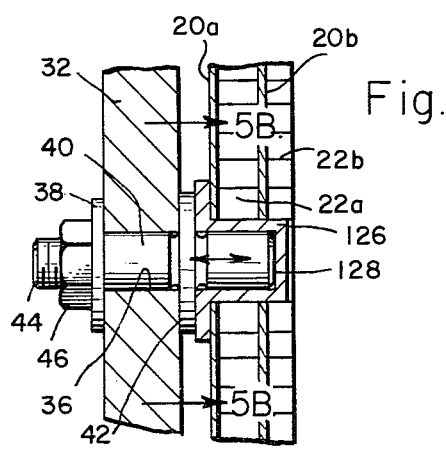
Figure 5B:
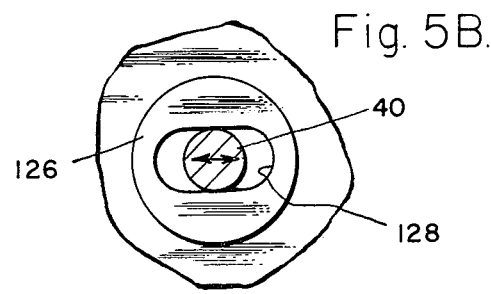

FIGS. 5A and 5B illustrate a mount 18 having an alternatively structured socket 126 therein, the opening 128 thereof being smooth to accommodate a pin 40. The pin is inserted through the aperture 36 of wall 32 from the inside until a stop portion 42 of the pin 40 engages the inner surface of wall 32. An externally threaded end portion 44 may then be secured by a nut 46 and washer 38 to hold the pin in fixed position on the wall 32. As can be seen in FIG. 5B, the opening 128 of the socket 126 is laterally elongated in one direction so that lateral motion in that direction is permitted between the pin 40 and socket 126. This structure permits lateral motion of a point on the heat exchanger core with respect to the shell 14 in response to thermal expansion resulting from heating of the core.

Figure 6:
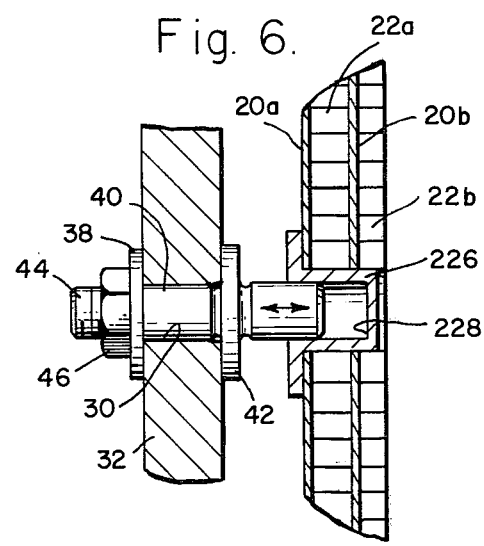

FIG. 6 illustrates the mount 18 as being provided with a socket 226 having a circular, smooth walled opening 228 therein for accommodating the pin 40. This structure prevents lateral motion of the heat exchanger core but permits motion of the core along the axis of the pin, coming closer to and going farther from the wall 32 upon occurrence of thermal expansion or contraction of heat exchanger core 24.

Figure 7:
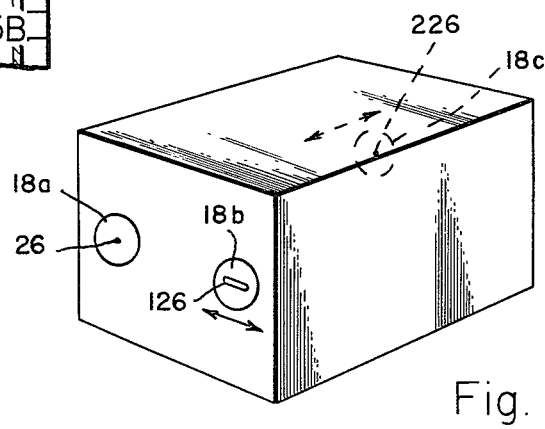
FIG. 7 is a perspective representation of the heat exchanger core of FIG. 1 illustrating an alternate mounting arrangement obtainable with the mounting means of this invention.

FIG. 7 illustrates a heat exchanger core 24 and illustrates an alternative mounting arrangement whereby the core may be secured by use of three mounts 18, each having a differently configured socket. Mount 18a contains a socket 26 having a threaded opening 28 for fixed point mounting with respect to the shell as shown in FIG. 4. This mount will form a fixed reference point for expansion and contraction of the core. Mount 18b has a socket 126 therein permitting lateral expansion from the fixed point while otherwise holding the heat exchanger firmly in place as shown in FIGS. 5A and 5B. Mount 18c has a socket 226 and provides for expansion in the other direction by allowing motion toward and away from the fixed point as shown in FIG. 6. Thus, by using each type of mount, a heat exchanger core may be suitably mounted while allowing for unrestrained thermal expansion and contraction of the core. Further, the use of the mounting device of this invention permits the core to be held without physical damage which could result from mechanical stresses such as vibration or those occurring during thermal transients. The radial offset fins or honeycomb structure utilized in the mount receive any such mechanical stress while the core only contacts material of a similar mechanical stiffness to the material of the core. The radial offset fins are also capable of taking shear load in any direction thus providing further protection against damage. By utilizing the socket 26 in the mounting device for pin or bolt attachment of the core, possible high moment-loads are avoided.

We claim:

1. A mount for supporting a heat exchanger core within a housing having inwardly extending post means, said mount comprising:
   at least one layer of metallic hollow core structure means for floatably supporting said core within the housing;
   support means cooperative with said structure means;
   socket means having an opening within said mount for releasably attaching said mount to said post means;
   means affixing an inner end of said metallic hollow core structure against the core;
   wherein said metallic hollow core structure comprises radially disposed fins.

2. A mount as in claim 1 including a plurality of layers of said fins and wherein said support means comprises sheet meanss supportively secured to each of said layers.

3. A mount as in claim 2 wherein adjacent layers of fins and plates are increased in thickness and strength corresponding to increased distance from said core.

4. A mount as in claim 1 wherein said post means is threaded and said socket means has a threaded opening for fixedly engaging said post means.

5. A mount as claim 1 wherein said socket means has an opening therein and at least one of said post and said socket opening is substantially smooth walled.

6. A mount as in claim 5 wherein said socket opening is generally cylindrical and dimensioned to permit axial relative motion between said socket means and said post means.

7. A mount as in claim 5 wherein said opening has a generally oval cross section and is dimensioned to permit relative motion between said socket means and said post means.

8. A mount for supporting a heat exchanger core within a housing, said mount comprising:
   a plurality of layers of metal fins for floatably supporting a core within the housing;
   support means cooperative with said layers of metal fins;

socket means positioned with said layers of metal fins to form an opening in said mount;

post means secured to said housing and extending into said opening for releasably attaching an outer end of said mounting to the housing; and means affixing an inner end of the mounts against the core.

9. A mount for supporting a heat exchanger core in a housing having inwardly extending post means for supportively cooperating with said mount, said mount comprising:

a plurality of layers of radially diposed resilient fins interspersed between successive thin metal sheets in sandwich configuration, said thin metal sheets differing in thickness and decreasing in thickness according to their proximity to the heat exchanger core;

means cooperative with said plurality of layers of fins and with said metal sheets for supportively uniting same;

socket means centrally disposed within an outer layer of said fins and having an opening in an outer end of said mount for engaging said post means; and means affixing an inner end of said mount against the core.

10. A method of mounting a heat exchanger core in a housing having walls, said method comprising the steps of:

affixing a plurality of mounting means of metallic hollow core structure to said core, each having an opening extending into said mounting means;

providing a plurality of apertures in said walls, each positioned in alignment with one of said mounting means openings;

positioning pin means in each of said aligned aperture and opening; and securing each of said pin means against one of said housing walls;

wherein affixing each of said mounting means to said core comprises:

providing a first layer of metallic hollow core structure;

securing a first metallic sheet on one side of said first layer;

sandwiching one or more additional layers of alternating metallic hollow core structure and metallic sheets to said first metallic sheet;

inserting socket means containing said opening into an outer end of said sandwiched layers; and affixing an inner end of said sandwiched layers to said core.

11. A method as in claim 10 wherein the step of affixing mounting means comprises;

affixing first mounting means at a first point on a first surface of said core;

affixing a second mounting means having a smooth, opening at a second point on said first surface, said opening being elongated with a major axis thereof directed toward said first point; and affixing a third mounting means having a smooth, substantially cylindrical opening on a second surface of said core opposite said first surface, with the openings of said first and third mounting means in substantial alignment.

12. A method as in claim 11 wherein said step of securing each of said pin means includes:

threadably connecting a first pin means having a threaded end into said first mounting means opening for fixed mounting of said first mounting means in said housing;

threadably connecting second pin means to a wall of said housing with a smooth end extending into said second mounting means opening for permitting change in core dimension in a first direction; and threadably connecting third pin means to an additional wall of said housing with a smooth end extending into said third mounting means opening for permitting change in core dimension in a second direction.

13. A mount for supporting a heat exchanger core within a housing, said mount comprising:

a plurality of layers of metal fins for floatably supporting a core within the housing;

support means cooperative with said layers of metal fins;

means for affixing an inner end of said mount against the core; and means for releasably attaching an outer end of said mount to said housing at an attachment point on said mount;

each of said layers of metal fins being substantially radially disposed and extending outwardly from said attachment point.

14. A mount as in claim 13 wherein said housing has post means operatively associated therewith and said releasable attachings means positioned within said layers of metal fins to form an opening for receiving said pin means.

15. A mount as in claim 14 wherein said opening is generally circular in cross section.

16. A mount as in claim 15 wherein said opening is threaded.

17. A mount as in claim 16 wherein said pin means comprises bolt means.

18. A mount as in claim 14 wherein said opening is generally oval in cross section.

19. A mount for supporting a heat exchanger core within a housing, said housing having inwardly extending post means for cooperating with said mount, said mount comprising:

socket means supportively received in said mount, said socket means defining an opening for receiving said post means, at least one of said opening and said post means being substantially smooth walled, and said opening being generally cylindrical and dimensioned to permit axial motion between said socket means and said post means;

a plurality of layers of metallic fins disposed radially with respect to said socket means;

a plurality of plates interdigitating with said plurality of layers of fins, said plates and said layers of fins being supportively secured to one another, successive layers of said fins and said plates increasing in thickness and strength with increasing distance from said heat exchanger core; and means affixing an inner layer of said fins to said core.

20. A mount for supporting a heat exchanger core within a housing, said housing having inwardly extending post means for cooperating with said mount, said mount comprising:

socket means supportively received in said mount, said socket means defining an opening for receiving said post means, at least one of said opening and said post means being substantially smooth walled, and said opening having a generally oval cross section and being dimensioned to permit relative transverse motion between said socket means and said post means;
a plurality of layers of metallic fins disposed radially with respect to said socket means;
a plurality of plates interdigitating with said plurality of layers of fins, said plates and said layers of fins being supportively secured to one another, successive layers of said fins and said plates increasing in thickness and strength with increasing distance from said heat exchanger core; and
means affixing an inner layer of said fins to said core.

21. A heat exchanger including a mount according to either claim 19 or 20 supporting a core thereof.

22. A heat exchanger having a core supported therein by a first mount establishing a fixed point between one end of said core and a housing of said heat exchanger; said heat exchanger further including a second mount according to claim 23 supporting an opposite end of said core, said first and said second mounts cooperating to define an axis, and said second mount cooperating with said core and with said housing to permit axial motion therebetween along said axis.

23. A heat exchanger according to claim 22 further including a third mount according to claim 20 supporting said one end of said core, said first mount and said third mount cooperating to define a second axis, and said generally oval opening of said third mount being aligned with said second axis to permit relative transverse motion between said core and said housing along said second axis.

24. A heat exchanger having a core supported therein by a first mount establishing a fixed point between one end of said core and a housing of said heat exchanger; said heat exchanger further including a second mount according to claim 24 supporting said one end of said core, said first mount and said second mount cooperating to define a first axis, said generally oval opening of said second mount being aligned with said first axis to permit relative transverse motion between said core and said housing along said first axis.

25. The invention of claim 24 wherein said heat exchanger includes a third mount according to claim 19 supporting an opposite end of said core, said first mount and said third mount cooperating to define a second axis, said third mount cooperating with said core and with said housing to permit relative motion therebetween along said second axis.

26. A heat exchanger including a chambered shell having walls and a core supported therein by a mount extending between said core and one of said walls of said shell to define an axis, said mount comprising:
a plurality of axially stacked layers of axially extending resilient metal fins which are disposed radially with respect to said axis;
a plurality of transverse thin metal sheets interdigitating with said plurality of layers of fins, said plurality of layers of fins and said plurality of sheets being supportively joined together, one of said plurality of layers supportively joining with said core, one of said thin metal sheets defining an outer end for said mount adjacent said one wall;
a socket member centrally received axially within said one metal sheet and within an adjacent layer of said metal fins, said socket member coupling supportively with the remainder of said mount and defining an axially extending recess opening toward said one wall; and
a pin member supportively coupling with said one wall and extending axially inwardly within said recess toward said core, said pin member supportively cooperating with said socket to support said core.

27. The invention of claim 26 wherein successive ones of said plurality of thin metal sheets differ in thickness, said thin metal sheets and said plurality of layers of metal fins decreasing in thickness and strength with increasing proximity to said core.

28. The invention of claim 26 or 27 wherein said pin member threadably engages said socket member to secure the latter against said one wall.

29. The invention of claim 26 or 27 wherein said recess of said pin member and said socket member slidably coengage for axial relative movement.

30. The invention of claim 26 or 27 wherein said recess of said socket member is elongate transversely to define a transverse axis, said pin member and said socket slidably coengaging for relative movement along said transverse axis.

31. A heat exchanger comprising a core defining a pair of opposite ends, at least three mounts extending outwardly from said core to define respective axes, and a chambered shell having walls encompassing said core and cooperating with said mounts to floatably support said core within said shell while accommodating differential thermal expansion and contraction therebetween, a first and a second of said mounts attaching at respective first and second spaced apart points to one of said pair of opposite ends of said core, said first mount including a first socket member defining an axially extending recess, and first post means engaging a wall of said shell and extending axially into said first socket recess to fixedly secure said first mount and said core to said shell, said second mount including a second socket member defining a smooth-walled axially extending recess which is generally oval in transverse cross section, said oval second socket member recess defining a major axis, second post means engaging a wall of said shell and axially extending slidably into said second socket member recess to support said core, said major axis of said second socket member recess being aligned with a line defined by said first and second points to allow transverse relative movement between said core and said shell at said second mount, said third mount attaching at a third point to the other of said pair of opposites ends of said core, said third mount including a third socket member defining a smooth-walled axially extending recess, third post means engaging a wall of said shell and slidably extending axially into said third socket member recess to support said core, said third socket member recess being axially aligned with said first point to permit axial relative movement between said core and said shell at said third mount.

32. The invention of claim 31 wherein each one of said at least three mounts includes:
at least two layers of axially extending fine-dimension fin structure disposed radially with respect to said mount axis;
at least two layers of transversely extending thin sheet material supportively interdigitating with said layers of fins, an inner layer of said fins supportively attaching to said core, an outer layer of said thin sheet meterial confronting a wall of said heat exchanger core,
a socket member disposed centrally in said outer end of said mount within said outer layer of sheet material and an adjacent layer of said fins, said socket member defining an axially extending recess disposed substantially at said mount axis.

33. The invention of claim 32 wherein said layers of fins and said layers of sheet material differ in respective strength and thickness, said layers of fins and said layers of sheet material decreasing in strength and thickness with increasing proximity to said core.

* * * * *

UNITED STATES PATENT AND TRADEMARK OFFICE
CERTIFICATE OF CORRECTION

PATENT NO. : 4,355,780

DATED : October 26, 1982

INVENTOR(S) : David G. Bridgnell et al.

It is certified that error appears in the above-identified patent and that said Letters Patent is hereby corrected as shown below:

FIGURES 1, 2 and 7, should appear as shown on the attached sheets.

UNITED STATES PATENT AND TRADEMARK OFFICE
CERTIFICATE OF CORRECTION

PATENT NO. : 4,355,780
DATED : October 26, 1982
INVENTOR(S) : David G. Bridgnell and Frederick W. Jacobsen It is certified that error appears in the above-identified patent and that said Letters Patent are hereby corrected as shown below:

Drawing Figure 1 should appear as shown below:

Fig. 1.

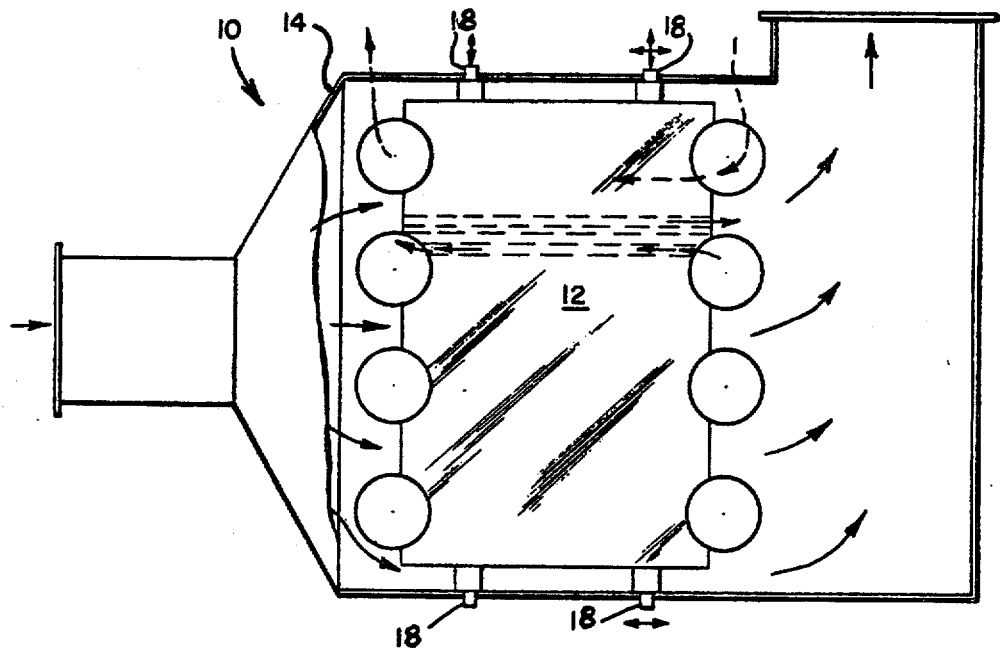

UNITED STATES PATENT AND TRADEMARK OFFICE
CERTIFICATE OF CORRECTION

PATENT NO. : 4,355,780

DATED : October 26, 1982

INVENTOR(S) : David G. Bridgnell and Frederick W. Jacobsen

It is certified that error appears in the above-identified patent and that said Letters Patent are hereby corrected as shown below:

Drawing Figure 2 should appear as shown below:

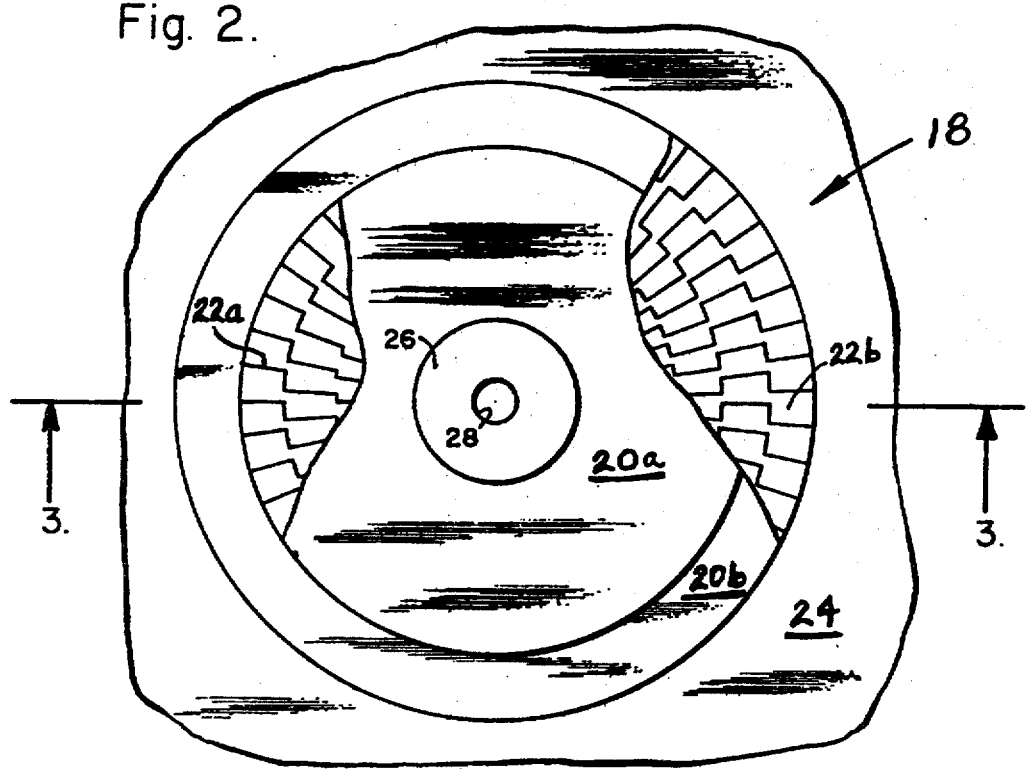

UNITED STATES PATENT AND TRADEMARK OFFICE
CERTIFICATE OF CORRECTION

PATENT NO. : 4,355,780            Page 4 of 4

DATED      : October 26, 1982

INVENTOR(S) : David G. Bridgnell and Frederick W. Jacobsen

It is certified that error appears in the above-identified patent and that said Letters Patent is hereby corrected as shown below:

Drawing Figure 7 should appear as shown below:

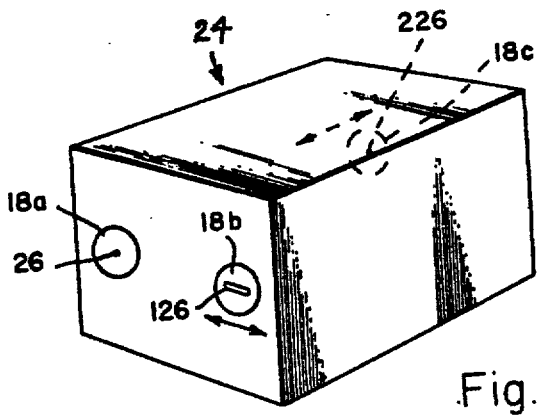

Fig. 7.

Signed and Sealed this

Fifteenth Day of February 1983

[SEAL]

Attest:

GERALD J. MOSSINGHOFF

Attesting Officer     Commissioner of Patents and Trademarks